(12) United States Patent
Lee

(10) Patent No.: US 12,555,853 B2
(45) Date of Patent: Feb. 17, 2026

(54) SECONDARY BATTERY AND BATTERY MODULE

(71) Applicant: LG Energy Solution, Ltd., Seoul (KR)

(72) Inventor: Han Young Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 672 days.

(21) Appl. No.: 17/911,843

(22) PCT Filed: Nov. 16, 2020

(86) PCT No.: PCT/KR2020/016093
§ 371 (c)(1),
(2) Date: Sep. 15, 2022

(87) PCT Pub. No.: WO2021/187717
PCT Pub. Date: Sep. 23, 2021

(65) Prior Publication Data
US 2023/0017099 A1    Jan. 19, 2023

(30) Foreign Application Priority Data
Mar. 18, 2020   (KR) ................ 10-2020-0033377

(51) Int. Cl.
*H01M 50/211*   (2021.01)
*H01M 10/04*    (2006.01)
(Continued)

(52) U.S. Cl.
CPC ..... *H01M 50/211* (2021.01); *H01M 10/0413* (2013.01); *H01M 50/183* (2021.01);
(Continued)

(58) Field of Classification Search
None
See application file for complete search history.

(56) References Cited

U.S. PATENT DOCUMENTS

| 7,595,128 B2 | 9/2009 | Lee et al. |
| 2003/0027036 A1 | 2/2003 | Emori et al. |

(Continued)

FOREIGN PATENT DOCUMENTS

| CN | 101887986 A | 11/2010 |
| CN | 102163708 A | 8/2011 |

(Continued)

OTHER PUBLICATIONS

Search Report dated Jan. 15, 2024 from Office Action for Chinese Application No. 202080098670.5 issued Jan. 16, 204. 2 pgs.
(Continued)

*Primary Examiner* — Scott J. Chmielecki
(74) *Attorney, Agent, or Firm* — Lerner David LLP

(57) ABSTRACT

A secondary battery may include an electrode assembly formed by alternately stacking an electrode and a separator; a battery case; a plurality of electrode tabs, each of which protrudes from the electrode assembly; a plurality of electrode leads, each of which has one end connected to the electrode tab and the other end protruding outward; a piezoelectric element which is disposed to the outside of a cup portion of the battery case that accommodates the electrode assembly and which, when the battery case expands in volume, receives pressure and supplies electric power to the outside; and a short-circuit inducing part which has a wire shape and both ends respectively positioned on sealing portions of the battery case that seal the electrode leads, wherein, when the electric power is applied from the piezoelectric element, both the ends respectively extend toward the electrode leads and come into contact with the electrode leads.

18 Claims, 8 Drawing Sheets

(51) Int. Cl.
  *H01M 50/183* (2021.01)
  *H01M 50/533* (2021.01)
  *H01M 50/578* (2021.01)

(52) U.S. Cl.
  CPC ....... *H01M 50/533* (2021.01); *H01M 50/578* (2021.01); *H01M 2200/20* (2013.01)

(56) References Cited

U.S. PATENT DOCUMENTS

| | | | |
|---|---|---|---|
| 2006/0017030 | A1 | 1/2006 | Koeneman |
| 2007/0122691 | A1 | 5/2007 | Lee et al. |
| 2010/0291421 | A1 | 11/2010 | Byun et al. |
| 2011/0200849 | A1 | 8/2011 | Byun et al. |
| 2012/0258340 | A1* | 10/2012 | Park ............ H01M 10/42 429/61 |
| 2012/0286719 | A1 | 11/2012 | Lee et al. |
| 2013/0313946 | A1* | 11/2013 | Lee ............ H02N 2/188 29/25.35 |
| 2014/0272571 | A1* | 9/2014 | Lang ............ H01M 4/366 427/122 |
| 2015/0044517 | A1 | 2/2015 | Mikhaylik et al. |
| 2015/0188305 | A1 | 7/2015 | Choi et al. |
| 2018/0183027 | A1 | 6/2018 | Lee et al. |
| 2018/0219246 | A1 | 8/2018 | Park |
| 2018/0287122 | A1 | 10/2018 | Mikhaylik et al. |
| 2019/0341595 | A1 | 11/2019 | Hong et al. |
| 2021/0033474 | A1 | 2/2021 | Yoon et al. |
| 2021/0126313 | A1* | 4/2021 | Lee ............ H01M 50/262 |
| 2022/0029239 | A1* | 1/2022 | Fukushima ..... H01M 50/105 |
| 2023/0017099 | A1* | 1/2023 | Lee ............ H01M 50/533 |

FOREIGN PATENT DOCUMENTS

| | | |
|---|---|---|
| CN | 107735883 A | 2/2018 |
| CN | 108987836 A | 12/2018 |
| CN | 109216772 A | 1/2019 |
| CN | 110036506 A | 7/2019 |
| JP | H08-171898 A | 7/1996 |
| JP | H11191436 A | 7/1999 |
| JP | 2004319463 A | 11/2004 |
| JP | 2007109455 A | 4/2007 |
| JP | 2008506913 A | 3/2008 |
| JP | 2009529209 A | 8/2009 |
| JP | 2010244844 A | 10/2010 |
| JP | 2013131461 A | 7/2013 |
| JP | 2019140022 A | 8/2019 |
| KR | 20070056494 A | 6/2007 |
| KR | 20090010410 A | 1/2009 |
| KR | 20120113674 A | 10/2012 |
| KR | 20120126624 A | 11/2012 |
| KR | 20130037863 A | 4/2013 |
| KR | 20150080123 A | 7/2015 |
| KR | 20160040664 A | 4/2016 |
| KR | 20170050926 A | 5/2017 |
| KR | 20180090099 A | 8/2018 |
| KR | 20190006643 A | 1/2019 |
| KR | 20190019461 A | 2/2019 |
| KR | 20190124040 A | 11/2019 |
| KR | 20200016662 A | 2/2020 |
| WO | 2015068871 A1 | 5/2015 |

OTHER PUBLICATIONS

International Search Report for Application No. PCT/KR2020/016093 mailed Feb. 23, 2021, pp. 1-3.
Extended European Search Report issued in Appln. No. 20925489.5 mailed Jun. 19, 2024 (7 pages).

* cited by examiner

SECONDARY BATTERY AND BATTERY MODULE

CROSS-REFERENCE TO RELATED APPLICATION

The present application is a national stage entry under 35 U.S.C. § 371 of International Application No. PCT/KR2020/016093, filed on Nov. 16, 2020, which claims priority to Korean Patent Application No. 10-2020-0033377, filed on Mar. 18, 2020, the disclosures of which are hereby incorporated by reference herein in their entireties.

TECHNICAL FIELD

The present invention relates to a secondary battery and a battery module, and more specifically, to a secondary battery and a battery module which are capable of inducing a short circuit between electrode leads, when operating abnormally, and preventing explosion due to an internal short circuit, thereby ensuring stability.

BACKGROUND ART

Generally, secondary batteries include nickel-cadmium batteries, nickel-hydrogen batteries, lithium ion batteries, lithium ion polymer batteries, and so on. Such secondary batteries have been used in large products requiring high output such as electric vehicles or hybrid electric vehicles, and power storage devices or backup-power storage devices for storing surplus generated power and renewable energy, as well as in small products such as digital cameras, P-DVDs, MP3 players, cellular phones, PDAs, portable game devices, power tools, and E-bikes.

In order to manufacture an electrode assembly, a positive electrode (cathode), a separator, and a negative electrode (anode) are prepared and stacked. In particular, positive electrode active material slurry is applied to a positive electrode collector, and negative electrode active material slurry is applied to a negative electrode collector, whereby the positive electrode (cathode) and the negative electrode (anode) are manufactured. Also, when the separator is interposed and stacked between the manufactured positive electrode and negative electrode, a unit cell is formed, and then, unit cells are stacked on each other to form an electrode assembly. Subsequently, when the electrode assembly is accommodated in a specific case and an electrolyte is injected therein, a secondary battery is manufactured.

In the related art, when a secondary battery is abnormally operated, for example, exposed to high temperature or over-charged or over-discharged, a separator is contracted due to heat generation, and a positive electrode and a negative electrode come into direct contact with each other. Thus, the possibility of occurrence of a short circuit (a short) increases. Electrons are rapidly moved inside the battery due to the short circuit, and accordingly, when the heat generation and side reaction occur, the secondary battery explodes. Thus, there has been a problem in safety. In particular, when an electrical malfunction, such as overcharging, over-discharging, or an external short circuit, occurs, a collector generates heat having higher temperature than that of an active material layer, because high electric current flows and heat conductivity of the collector is low. Subsequently, the heat is diffused to accelerate thermal, chemical, and electrochemical reactions of components such as an active material and an electrolyte, thereby leading thermal runaway.

PRIOR ART DOCUMENTS

Patent Documents

Korean Patent Publication No. 2007-0056494

DISCLOSURE OF THE INVENTION

Technical Problem

An object to be solved by the present invention is to provide a secondary battery and a battery module, which are capable of inducing a short circuit between electrode leads, when operated abnormally, and preventing explosion due to an internal short circuit, thereby ensuring stability.

The objects of the present invention are not limited to the above-mentioned object, and other objects that have not been mentioned above will become evident to those skilled in the art from the following description.

Technical Solution

A secondary battery according to an embodiment of the present invention to achieve the above object comprises: an electrode assembly formed by alternately stacking an electrode and a separator; a battery case configured to accommodate the electrode assembly therein; a plurality of electrode tabs, each of which protrudes from the electrode assembly to one side; a plurality of electrode leads, each of which has one end connected to the electrode tab and the other end protruding outward from the battery case; a piezoelectric element which is disposed to the outside of a cup portion of the battery case that accommodates the electrode assembly and which, when the battery case expands in volume, receives pressure and supplies electric power to the outside; and a short-circuit inducing part which has a wire shape and both ends respectively positioned on sealing portions of the battery case that seal the electrode leads, wherein, when the electric power is applied from the piezoelectric element, both the ends respectively extend toward the electrode leads and come into contact with the electrode leads.

Also, the short-circuit inducing part may be made of electroactive polymers (EAP).

Also, the piezoelectric element may be attached to an outer surface of the cup portion.

Also, the piezoelectric element may have a shape corresponding to that of the cup portion.

Also, the piezoelectric element may be attached to a central area of the cup portion.

Also, the short-circuit inducing part may be provided in close contact with a sealing part of the battery case.

Also, when the plurality of electrode leads are provided in opposite directions of the electrode assembly, the short-circuit inducing part may also be provided in close contact with a portion of a sealing part defined along a peripheral edge of the battery case.

Also, the short-circuit inducing part may be provided along an outer surface of the cup portion of the battery case that accommodates the electrode assembly.

Both the ends of the short-circuit inducing part may respectively extend out of the sealing portions and be bent toward the electrode leads.

A battery module according to an embodiment of the present invention to achieve the above object comprises: a secondary battery and a housing configured to accommodate the secondary battery therein, wherein the secondary battery comprises: an electrode assembly formed by alternately stacking an electrode and a separator; a battery case configured to accommodate the electrode assembly therein; a plurality of electrode tabs, each of which protrudes from the electrode assembly to one side; a plurality of electrode leads, each of which has one end connected to the electrode tab and the other end protruding outward from the battery case; a piezoelectric element which is disposed to the outside of the cup portion of the battery case that accommodates the electrode assembly and which, when the battery case expands in volume, receives pressure and supplies electric power to the outside; and a short-circuit inducing part having a wire shape and both ends respectively positioned on sealing portions of the battery case that seal the electrode leads, wherein, when the electric power is applied from the piezoelectric element, both the ends respectively extend toward the electrode leads and come into contact with the electrode leads.

Also, the short-circuit inducing part may be made of electroactive polymers (EAP).

Also, the piezoelectric element may be attached to an inner surface of the housing.

Also, the short-circuit inducing part may be provided in close contact with and along an edge of an inner space of the housing.

Also, both the ends of the short-circuit inducing part may respectively extend out of the sealing portions and be bent toward the electrode leads.

In addition, the present invention provides a battery pack comprising the battery module and also provides a device comprising the battery pack.

The device may comprise, but not limited to, a computer, a laptop computer, a smart phone, a mobile phone, a tablet PC, a wearable electronic device, a power tool, an electric vehicle (EV) a hybrid electric vehicle (HEV), a plug-in hybrid electric vehicle (PHEV), or a power storage device.

Structures and manufacturing methods of the battery pack and the device are known in the art, and thus, a detailed description thereof is omitted.

Other specific features of the present invention are included in the detailed description and drawings.

Advantageous Effects

The embodiments of the present invention may have at least the following effects.

When the battery case expands in volume upon abnormal operation, and the electric power is produced from the piezoelectric element, both the ends of the short-circuit inducing part respectively come into contact with the electrode leads. Accordingly, the short circuit between the electrode leads may be induced to prevent explosion due to the internal short circuit, thereby ensuring the stability.

The effects of the present invention are not limited by the aforementioned description, and thus, more varied effects are involved in this specification.

MODE FOR CARRYING OUT THE INVENTION

Figure 1:
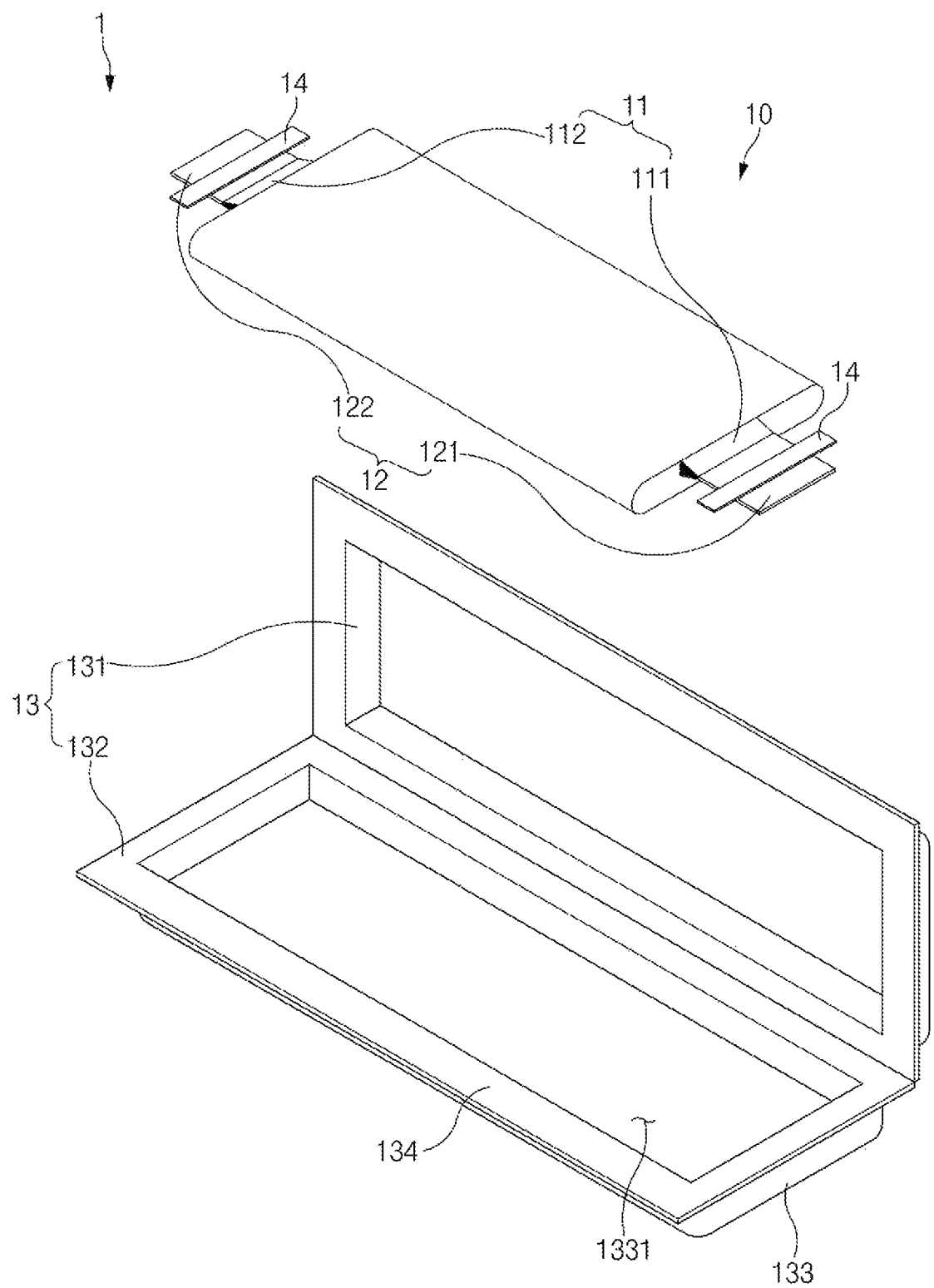
FIG. 1 is an assembly view of a secondary battery according to an embodiment of the present invention.

Advantages and features of the present invention, and implementation methods thereof will be clarified through embodiments described in detail with reference to the accompanying drawings. The present invention may, however, be embodied in various different forms and should not be construed as limited to the embodiments set forth herein. Rather, these embodiments are provided so that this invention will be thorough and complete, and will fully convey the scope of the present invention to those skilled in the art. Further, the present invention is defined only by scopes of claims. Like reference numerals refer to like elements throughout.

Unless otherwise defined, all terms (including technical and scientific terms) used herein have the same meaning as commonly understood by one of ordinary skill in the art to which the present invention belongs. Also, terms as defined in a generally used dictionary are not construed ideally or excessively unless defined apparently and specifically.

The terms used in this specification are used only for explaining embodiments while not limiting the present invention. In this specification, the singular forms include the plural forms as well, unless the context clearly indicates otherwise. The meaning of "comprises" and/or "comprising" used in the specification does not exclude the presence or addition of one or more components other than the mentioned component(s).

Hereinafter, preferred embodiments of the present invention will be described in detail with reference to the accompanying drawings.

Figure 2:
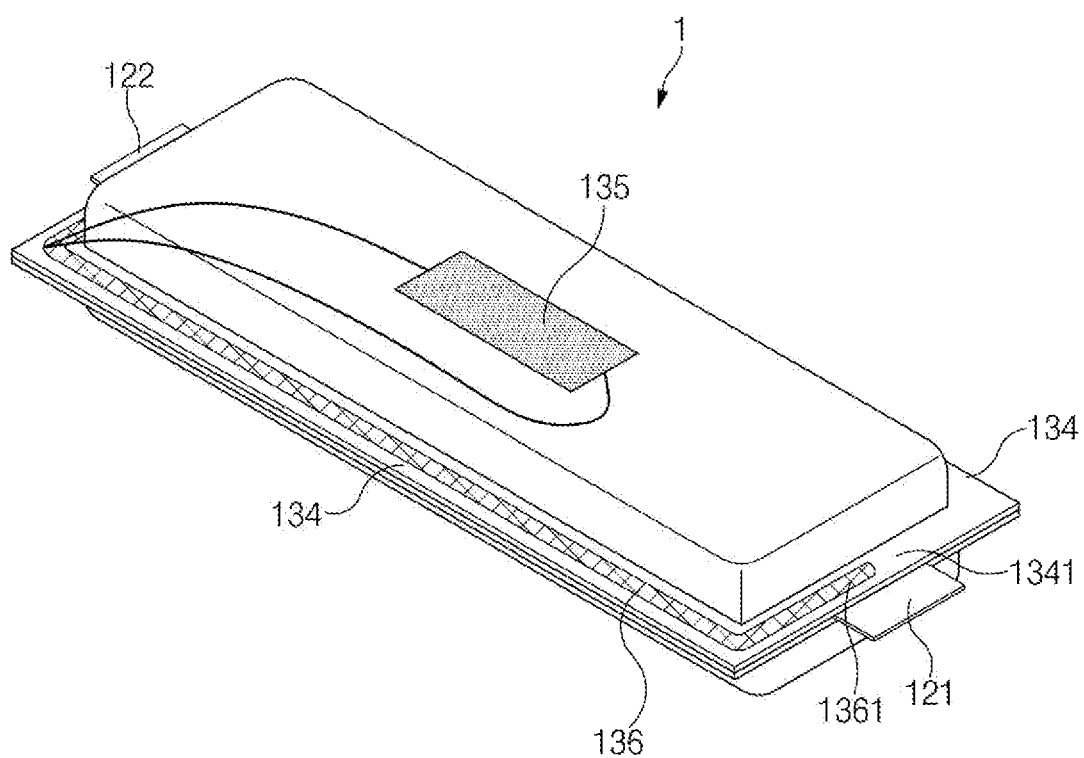
FIG. 2 is a perspective view of the secondary battery according to an embodiment of the present invention.

FIG. 1 is an assembly view of a secondary battery 1 according to an embodiment of the present invention, and FIG. 2 is a perspective view of a secondary battery 1 according to an embodiment of the present invention.

According to an embodiment of the present invention, when a battery case expands in volume upon abnormal operation and the electric power is produced from a piezoelectric element, both ends 1361 of a short-circuit inducing part 136 respectively come into contact with electrode leads 12. Accordingly, a short circuit between the electrode leads 12 may be induced to prevent explosion due to the internal short circuit, thereby ensuring the stability.

For this, a secondary battery 1 according to an embodiment of the present invention comprises: an electrode assembly 10 formed by alternately stacking an electrode and a separator; a battery case 13 to accommodate the electrode assembly 10 therein; a plurality of electrode tabs 11, each of which protrudes from the electrode assembly 10 to one side; a plurality of electrode leads 12, each of which has one end connected to the electrode tab 11 and the other end protruding outward from the battery case 13; a piezoelectric element 135 which is disposed to the outside of a cup portion 133 of the battery case 13 that accommodates the electrode assembly 10 and which, when the battery case 13 expands in volume, receives pressure and supplies electric power to the outside; and a short-circuit inducing part 136 which has a wire shape and both ends 1361 respectively positioned on sealing portions 1341 of the battery case 13 that seal the electrode leads 12, wherein, when the electric power is applied from the piezoelectric element, both the ends 1361 respectively extend toward the electrode leads 12 and come into contact with the electrode leads 12.

The electrode assembly 10 may be formed by alternately stacking the electrodes and the separator. First, slurry, in which an electrode active material, a binder, and a plasticizer are mixed, is applied to a positive electrode collector and a negative electrode collector to manufacture a positive electrode and a negative electrode. Then, the positive electrode and the negative electrode are stacked on both sides of a separator to form the electrode assembly 10 having a predetermined shape. Subsequently, the electrode assembly 10 is inserted into the battery case 13, an electrolyte is injected therein, and the battery case is sealed.

Particularly, the electrode assembly 10 comprises two types of electrodes, such as a positive electrode and a negative electrode, and a separator interposed between the electrodes to insulate the electrodes from each other. The electrode assembly 10 has a stacking type, a jelly roll type, or a stacking and folding type. The two types of electrodes, that is, the positive electrode and the negative electrode have structures in which active material slurry is applied to electrode collectors having metal foil or metal mesh shapes comprising aluminum and copper, respectively. The slurry may be generally formed by mixing granular active materials, subsidiary conductors, binders, plasticizers, and so on in a state where a solvent is added. The solvent is removed during a subsequent process.

The electrode assembly 10 comprises the electrode tab 11 as illustrated in FIG. 1. The electrode tab 11 is connected to each of the positive electrode and the negative electrode of the electrode assembly 10 and protrudes outward from one side of the electrode assembly 10, thereby providing a path through which electrons may move between the inside and outside of the electrode assembly 10. The collector of the electrode assembly 10 has a portion which is coated with the electrode active material and an end portion, that is, a non-coating portion which is not coated with the electrode active material. Also, the electrode tab 11 may be formed by cutting the non-coating portion or formed by connecting a separate conductive member to the non-coating portion through ultrasonic welding or the like. Although the electrode tabs 11 may protrude from one side of the electrode assembly 10 side by side in the same direction as illustrated in FIG. 1, the embodiment is not limited thereto. The electrode tabs 11 may protrude in different directions.

The electrode lead 12 is connected to the electrode tab 11 of the electrode assembly 10 through spot welding or the like. Also, a portion of the electrode lead 12 is surrounded by an insulating part 14. The insulating part 14 is disposed to be limited within a sealing part 134, at which an upper case 131 and a lower case 132 of the battery case 13 are thermally fused, so that the electrode lead 12 is bonded to the battery case 13. Also, the insulating part 14 prevents electricity, generated from the electrode assembly 10, from flowing to the battery case 13 through the electrode lead 12, and allows the sealing of the battery case 13 to be maintained. Thus, the insulating part 14 is made of a non-conductor having non-conductivity in which the electricity does not flow well. Generally, although relatively thin insulating tape easily attached to the electrode lead 12 is widely used as the insulating part 14, the embodiment is not limited thereto. Various members may be used as long as the members are capable of insulating the electrode lead 12.

One end of the electrode lead 12 is connected to the electrode tab 11, and the other end thereof protrudes outward from the battery case 13. That is, the electrode lead 12 comprises a positive electrode lead 121 which has one end connected to a positive electrode tab 111 and extends in a direction in which the positive electrode tab 111 protrudes and a negative electrode lead 122 which has one end connected to a negative electrode tab 112 and extends in a direction in which the negative electrode tab 112 protrudes. Here, the other end of each of the positive electrode lead 121 and the negative electrode lead 122 protrudes outward from the battery case 13 as illustrated in FIG. 1. Accordingly, the electricity generated inside the electrode assembly 10 may be supplied to the outside. Also, since the positive electrode tab 111 and the negative electrode tab 112 protrude in various directions, the positive electrode lead 121 and the negative electrode lead 122 may also extend in various directions.

The positive electrode lead 121 and the negative electrode lead 122 may have materials different from each other. That is, the positive electrode lead 121 may have the same aluminum (Al) material as the positive electrode collector, and the negative electrode lead 122 may have the same copper (Cu) material or nickel (Ni)-coated copper material as the negative electrode collector. Also, a portion of the electrode lead 12 protruding outward from the battery case 13 serves as a terminal part and is electrically connected to an external terminal.

The battery case 13 is a pouch made of a flexible material. Hereinafter, the battery case 13 will be described as being the pouch. The battery case 13 is sealed after the electrode assembly 10 is accommodated therein so that a portion of the electrode lead 12, i.e., the terminal part is exposed. The battery case 13 comprises the upper case 131 and the lower case 132 as illustrated in FIG. 1. The lower case 132 has a cup portion 133 to provide an accommodation space 1331 in which the electrode assembly 10 may be accommodated, and the upper case 131 covers the accommodation space 1331 from above so that the electrode assembly 10 is not separated to the outside of the battery case 13. Here, as illustrated in FIG. 1, the upper case 131 also has a cup portion 133 in which an accommodation space 1331 is provided, and thus, the electrode assembly 10 may be accommodated in an upper portion. Although the upper case 131 and the lower case 132 may be manufactured such that the respective sides thereof are connected to each other as illustrated in FIG. 1, the embodiment is not limited thereto. The cases may be diversely manufactured, for example, individually manufactured and separated from each other.

The piezoelectric element 135 is disposed to the outside of the cup portion 133 and receives pressure and supplies electric power to the outside when the battery case 13 expands in volume. Also, the short-circuit inducing part 136 has both ends 1361, each of which is positioned on a sealing portion 1341 of the battery case 13 that seals the electrode lead 12. When the electric power is applied from the piezoelectric element 135, both the ends 1361 respectively extend toward the electrode leads 12 and come into contact with the electrode leads 12. The piezoelectric element 135 and the short-circuit inducing part 136 will be described in detail later.

When the electrode lead 12 is connected to the electrode tab 11 of the electrode assembly 10 and the insulating part 14 is provided on a portion of the electrode lead 12, the electrode assembly 10 is accommodated in the accommodation space 1331 provided in the cup portion 133 of the lower case 132, and the upper case 131 covers the space from above. Then, the electrolyte is injected to the inside, and the sealing part 134 provided on the edges of the upper case 131 and the lower case 132 is sealed. The electrolyte is to move lithium ions generated by an electrochemical reaction of the electrode during charging and discharging of the secondary battery 1. Also, the electrolyte may comprise a non-aqueous organic electrolyte, which is a mixture of a lithium salt and a high-purity organic solvent, or may comprise a polymer using a polymer electrolyte. Through the method described above, the pouch-type secondary battery 1 may be manufactured as illustrated in FIG. 2.

Figure 3:
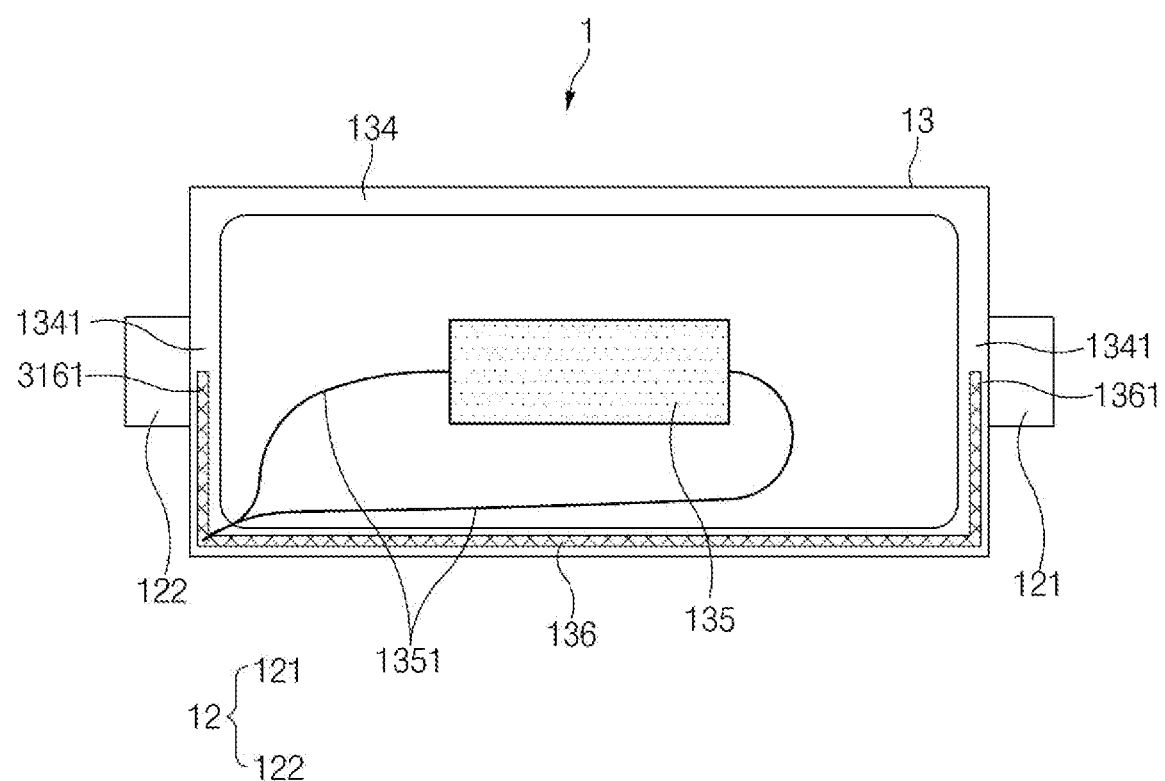
FIG. 3 is a plan view of a secondary battery according to an embodiment of the present invention.
Figure 4:
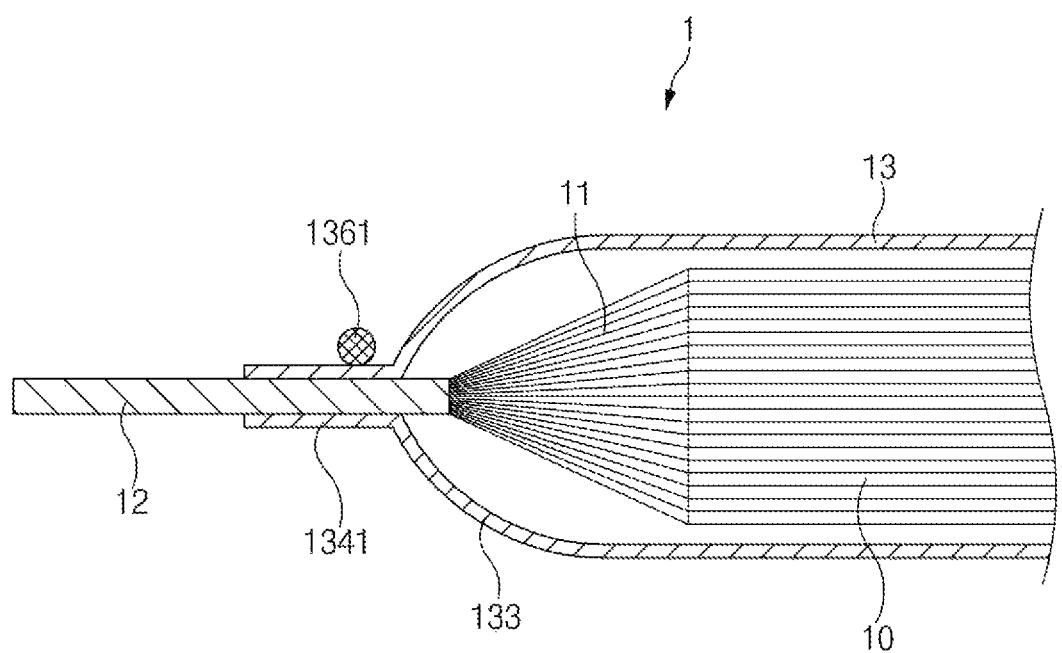
FIG. 4 is an enlarged cross-sectional view of a secondary battery according to an embodiment of the present invention.

FIG. 3 is a plan view of a secondary battery 1 according to an embodiment of the present invention, and FIG. 4 is an enlarged cross-sectional view of a secondary battery 1 according to an embodiment of the present invention.

As illustrated in FIG. 3, the secondary battery 1 according to an embodiment of the present invention comprises the piezoelectric element 135 and the short-circuit inducing part 136. The piezoelectric element 135 is an element which generates voltage when physical external force such as stress is applied thereto, and on the contrary, the shape is changed when voltage is applied thereto. As a representative piezoelectric element 135, barium titanate, a Rochelle salt, or the like is used.

The piezoelectric element 135 is disposed on the outside of a cup portion 133 of a battery case 13. Thus, when gas is generated inside the battery case 13 and the battery case 13 expands in volume, pressure is applied to the piezoelectric element. Accordingly, voltage is generated in the piezoelectric element 135, and electric power may be supplied to the outside. Particularly, according to an embodiment of the present invention, the piezoelectric element 135 may be directly attached to the outer surface of the cup portion 133. Thus, the piezoelectric element may respond sensitively to the expansion in volume of the battery case 13. That, even though the battery case 13 slightly expands in volume, the voltage may be immediately generated, and the electric power may be supplied to the outside.

As illustrated in FIG. 3, the piezoelectric element 135 may correspond to that of the cup portion 133. For example, if the cup portion 133 has a quadrangular shape, the piezoelectric element 135 may also have a quadrangular shape. Also, if the cup portion 133 has a circular shape, the piezoelectric element 135 may also have a quadrangular shape. Accordingly, the piezoelectric element 135 may receive the pressure in proportion to the amount of deformation when the cup portion 133 is deformed.

Also, it is desirable that the piezoelectric element 135 is attached to an approximately central area of the cup portion 133. If gas is generated inside the battery case 13, the cup portion 133 having the greatest flexibility is deformed most largely. In this case, as the piezoelectric element 135 is attached to the central area of the cup portion 133, the pressure may be applied uniformly to the entire piezoelectric element 135 when the cup portion 133 is deformed.

The short-circuit inducing part 136 may have an elongated wire shape. Also, as the shape thereof is deformed when the electric power is applied from the piezoelectric element 135, both ends 1361 thereof respectively come into contact with the electrode leads 12. The short-circuit inducing part 136 may be made of electroactive polymers (EAP).

The electroactive polymers may be polymers which is deformable, for example, expanded, contracted, or bent by electrical stimulation. As representative electroactive polymers, ferroelectric polymer, dielectric elastomer, or the like is used. In particular, polyvinylidene fluoride (hereinafter, PVDF)-based polymer having relatively high piezoelectric property is widely used as the ferroelectric polymer.

As illustrated in FIG. 4, the short-circuit inducing part 136 may be provided in close contact with the sealing part 134 of the battery case 13. Accordingly, the short-circuit inducing part 136 may be prevented from being damaged by external friction, while the size and shape of the secondary battery 1 are not significantly changed by the short-circuit inducing part 136. If the plurality of electrode leads 12 are provided in opposite directions of the electrode assembly 10 as illustrated in FIG. 3, the short-circuit inducing part 136 may also be provided in close contact with a portion of the sealing part 134 defined along a peripheral edge of the battery case 13. However, the embodiment is not limited thereto, and the short-circuit inducing part 136 may also be provided along an outer surface of the cup portion 133 of the battery case 13 that accommodates the electrode assembly 10. Accordingly, the short-circuit inducing part 136 may be provided along the shortest path between the plurality of electrode leads 12, and thus, the length of the short-circuit inducing part 136 may be minimized to thereby ensure economic feasibility.

However, if the plurality of electrode leads 12 are provided in the same directions of the electrode assembly 10, the short-circuit inducing part 136 may also be provided in close contact with a portion of a sealing part 134 defined between the plurality of electrode leads 12 in the battery case 13. That is, the embodiment is not limited thereto, and the short-circuit inducing part 136 may be provided in close contact with the battery case 13 in various ways.

As illustrated in FIG. 4, both the ends 1361 of the short-circuit inducing part 136 are positioned on the sealing portions 1341 of the battery case 13 that seal the electrode leads 12. Accordingly, both the ends 1361 of the short-circuit inducing parts 136 are positioned closest to the electrode leads 12 and may easily respectively come into contact with the electrode leads 12 when extending toward the electrode leads 12 later. Also, wires 1351 connected to the piezoelectric element 135 are connected to the short-circuit inducing part 136 at a point positioned in the vicinity of a vertex of the cup portion 133 rather than at a central area of an edge of the cup portion 133. Accordingly, disconnection or damage to the wires 1351, which have been connected to the piezoelectric element 135, due to external obstacles may be minimized.

Figure 5:
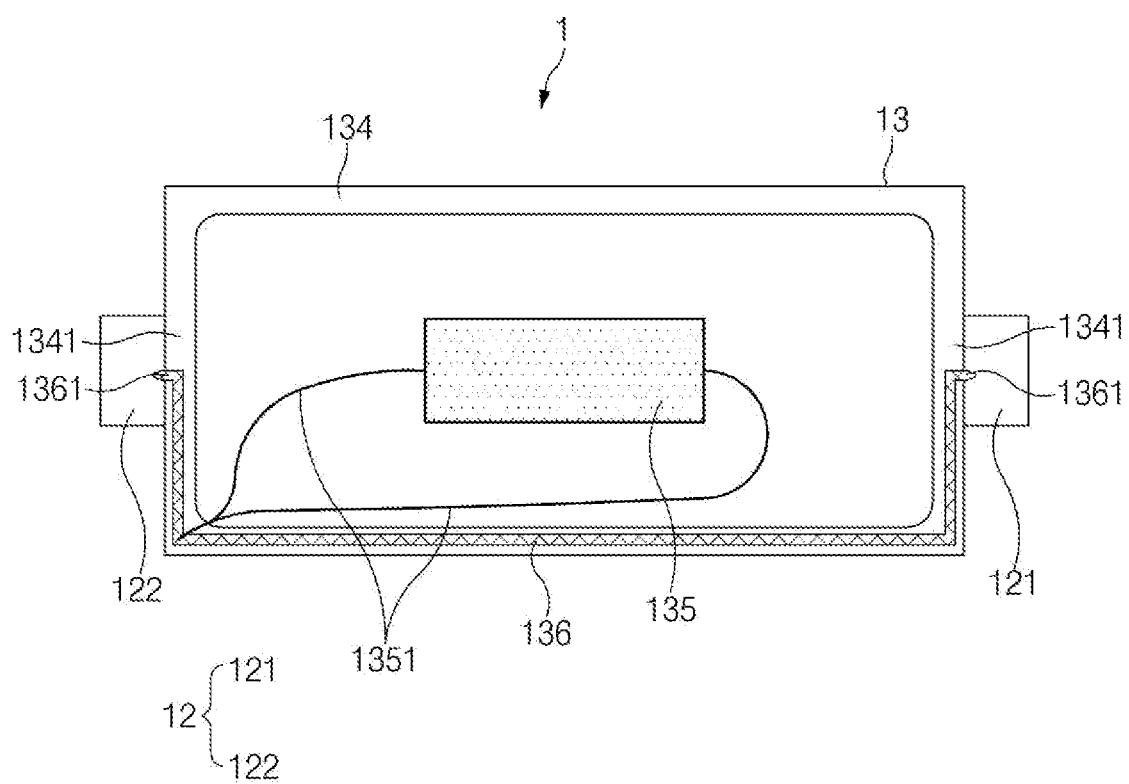
FIG. 5 is a plan view of a secondary battery when both ends of a short-circuit inducing part according to an embodiment of the present invention extend.
Figure 6:
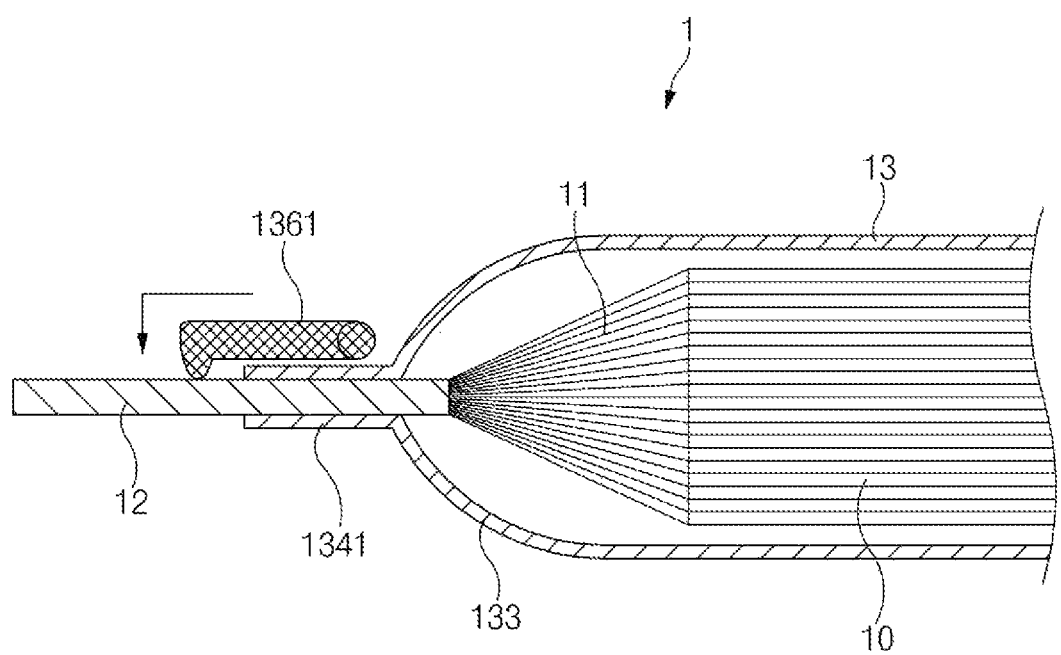
FIG. 6 is an enlarged cross-sectional view of a secondary battery when both ends of a short-circuit inducing part according to an embodiment of the present invention extend.

FIG. 5 is a plan view of the secondary battery 1 when both the ends 1361 of the short-circuit inducing part 136 according to an embodiment of the present invention extend, and FIG. 6 is an enlarged cross-sectional view of the secondary battery 1 when both the ends 1361 of the short-circuit inducing part 136 according to an embodiment of the present invention extend.

The piezoelectric element 135 generates voltage when pressure is applied thereto, and then supplies electric power to the outside. Thus, when gas is generated inside the battery case 13 and the battery case 13 expands in volume, the piezoelectric element 135 receives the pressure and supplies the electric power to the outside. Also, when the short-circuit inducing part 136 receives the electric power from the piezoelectric element 135, the shape thereof is changed. In particular, both the ends 1361 of the short-circuit inducing part 136 respectively extend toward the electrode leads 12 and come into contact with the electrode leads 12 as illustrated in FIG. 5.

The short-circuit inducing part 136 may be made of a conductive material. Thus, when both the ends 1361 of the short-circuit inducing part 136 respectively come into contact with the electrode leads 12, a short circuit (a short) occurs between the electrode leads 12. Accordingly, even though a short circuit occurs inside the secondary battery 1, a large explosion may be prevented from occurring, and the stability may be ensured.

Both the ends 1361 of the short-circuit inducing part 136 respectively extend toward the electrode leads 12 and come into contact with the electrode leads 12. Here, the electrode lead 12 may form a certain stepped region with respect to the sealing part 134. Thus, as illustrated in FIG. 6, both the ends 1361 of the short-circuit inducing part 136 respectively extend out of the sealing part 134, are then bent toward the electrode leads 12, and thus may come into contact with the electrode leads 12. However, the embodiment is not limited thereto. When both the ends 1361 merely continue to extend out of the sealing part 134, both the ends 1361 are deflected by the gravity and may come into contact with the electrode leads 12.

Figure 7:
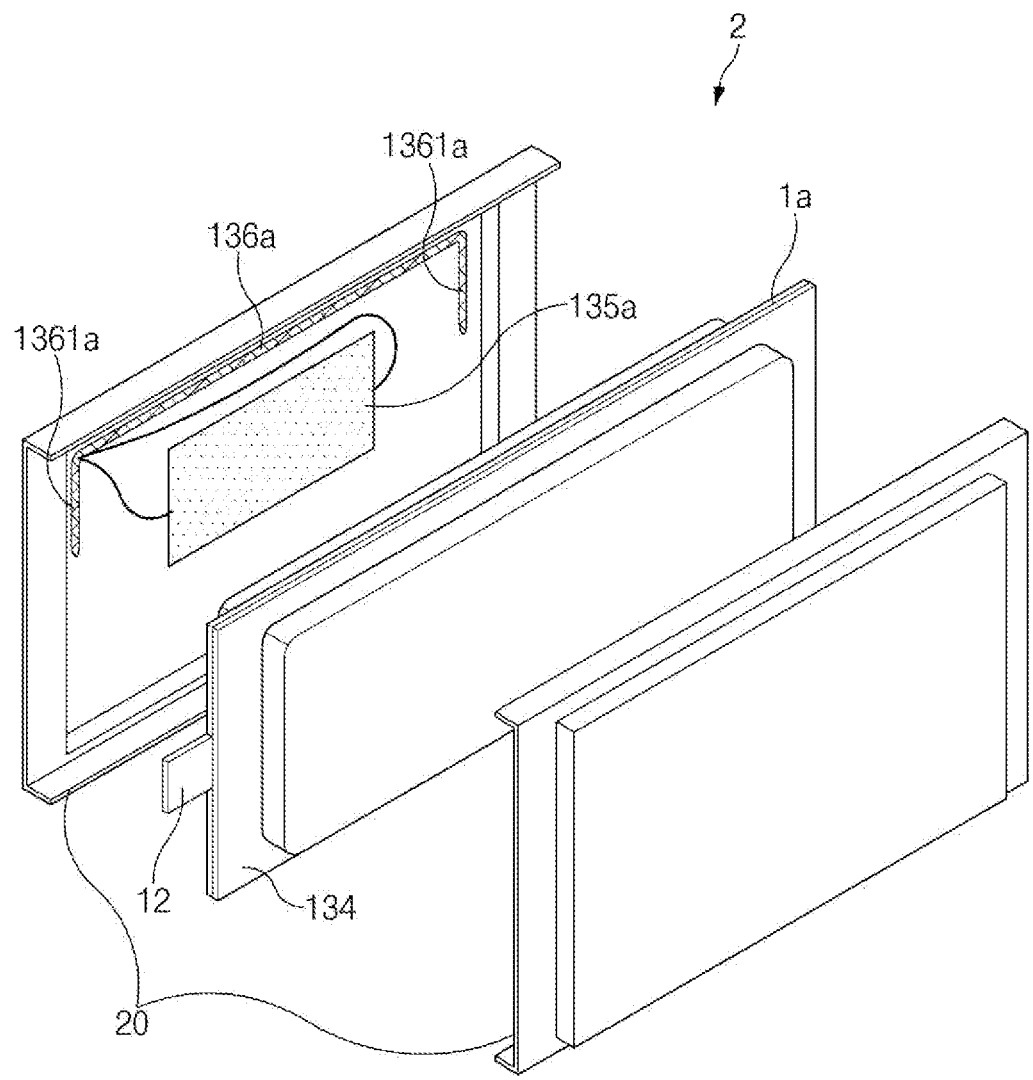
FIG. 7 is an assembly view of a battery module according to another embodiment of the present invention.

FIG. 7 is an assembly view of a battery module 2 according to another embodiment of the present invention.

According to the embodiment of the present invention, the piezoelectric element 135 is directly attached to the outer surface of the cup portion 133 of the battery case 13, and the short-circuit inducing part 136 is provided in close contact with the sealing part 134 of the battery case 13. Accordingly, the piezoelectric element 135 may respond sensitively to the expansion in volume of the battery case 13. Also, the short-circuit inducing part 136 may be prevented from being damaged by external friction, while the size and shape of the secondary battery 1 are not significantly changed by the short-circuit inducing part 136.

However, according to another embodiment of the present invention, when a secondary battery 1a is assembled into a battery module 2, a piezoelectric element 135a and a short-circuit inducing part 136a may be provided in a housing 20 of the battery module 2 rather than in a battery case 13 of the secondary battery 1a. Accordingly, the piezoelectric element 135a and the short-circuit inducing part 136a are fixed to the housing 20 having rigidity more easily than to the pouch-type battery case 13 having the flexibility.

A battery module 2 according to another embodiment of the present invention comprises a secondary battery 1a and a housing 20 that accommodates the secondary battery 1a therein, wherein the secondary battery 1a comprises: an electrode assembly 10 formed by alternately stacking an electrode and a separator; a battery case 13 to accommodate the electrode assembly 10 therein; a plurality of electrode tabs 11, each of which protrudes from the electrode assembly 10 to one side; a plurality of electrode leads 12, each of which has one end connected to the electrode tab 11 and the other end protruding outward from the battery case 13; a piezoelectric element 135a which is disposed to the outside of a cup portion 133 of the battery case 13 that accommodates the electrode assembly 10 and which, when the battery case 13 expands in volume, receives pressure and supplies electric power to the outside; and a short-circuit inducing part 136a which has a wire shape and both ends respectively positioned on sealing portions 134 of the battery case that seal the electrode leads 12, wherein, when the electric power is applied from the piezoelectric element 135a, both the ends 1361a respectively extend toward the electrode leads 12 and come into contact with the electrode leads 12.

The housing 20 accommodates the secondary battery 1a therein. As illustrated in FIG. 7, the secondary battery 1a may be accommodated by coupling upper and lower housings 20 to each other at both sides of the secondary battery 1a. The housing 20 may accommodate only one secondary battery 1a. However, the embodiment is not limited thereto, and a plurality of secondary batteries 1a may be accommodated.

The piezoelectric element 135a and the short-circuit inducing part 136a may be provided inside the housing 20 of the battery module 2. In particular, the piezoelectric element 135a is disposed outside the cup portion 133 of the battery case 13. However, the piezoelectric element 135a is not directly attached to the outer surface of the cup portion 133, but attached to the inner surface of the housing 20. However, since the inner surface of the housing 20 and the cup portion 133 of the battery case 13 are positioned very close to each other, when gas is generated inside the battery case 13 and the battery case 13 expands in volume, the piezoelectric element 135a immediately supplies the electric power to the outside.

When the plurality of electrode leads 12 are provided in opposite directions of the electrode assembly 10, the short-circuit inducing part 136a may be provided in close contact with and along an edge of an inner space of the housing 20. Also, both the ends 1361a of the short-circuit inducing part 136a are positioned on sealing portions 1341 that seal the electrode leads 12. Accordingly, both the ends 1361a of the short-circuit inducing parts 136a are positioned closest to the electrode leads 12 and may easily come into contact with the electrode leads 12, respectively, when extending toward the electrode leads 12 later.

Figure 8:
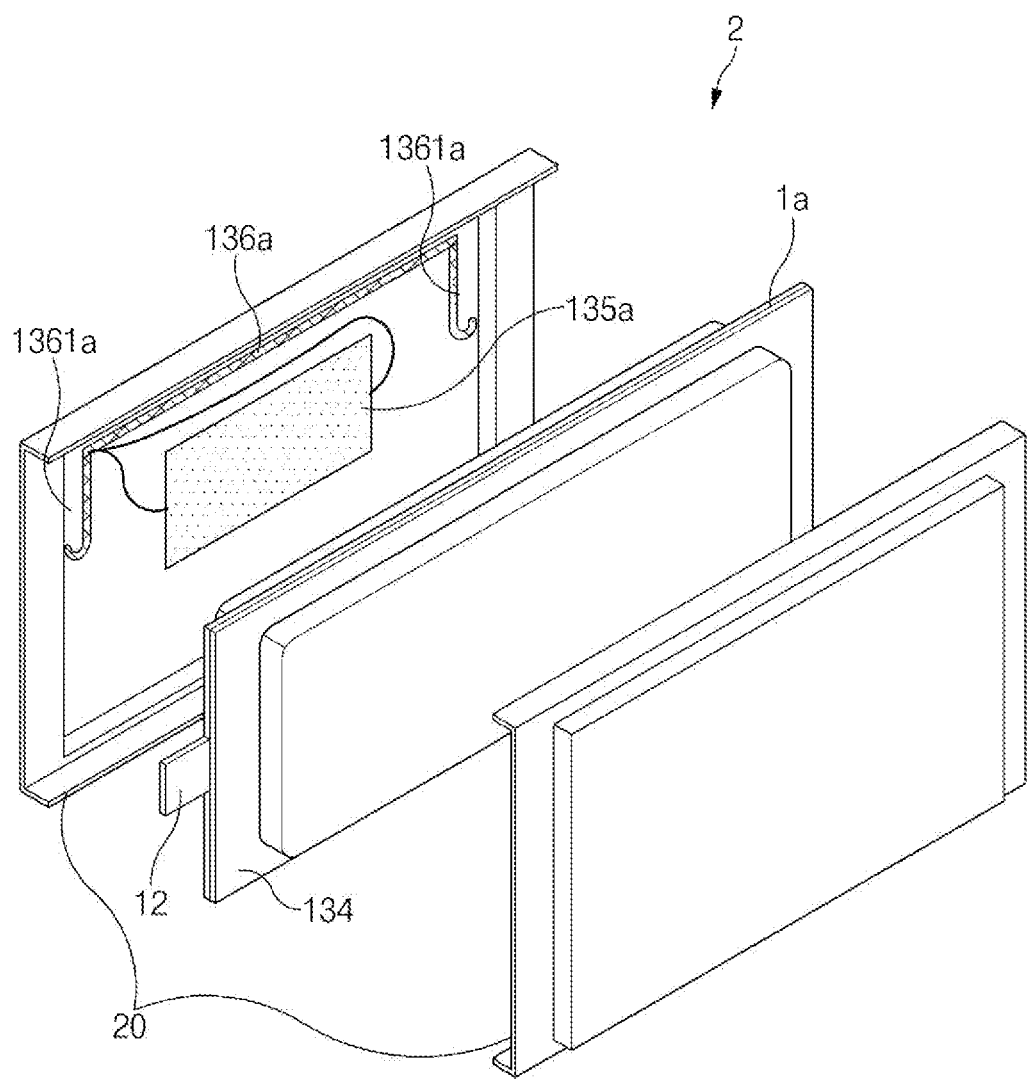
FIG. 8 is an assembly view of a battery module when both ends of a short-circuit inducing part according to another embodiment of the present invention extend.

FIG. 8 is an assembly view of the battery module 2 when both the ends 1361a of the short-circuit inducing part 136a according to another embodiment of the present invention extend.

Thus, when gas is generated inside the battery case 13 and the battery case 13 expands in volume, the piezoelectric element 135a receives the pressure and supplies the electric power to the outside. Also, when the electric power is applied from the piezoelectric element 135a, both the ends 1361a of the short-circuit inducing part 136a respectively extend toward the electrode leads 12 and come into contact with the electrode leads 12 as illustrated in FIG. 8. Here, both the ends 1361a of the short-circuit inducing part 136a respectively extend out of the sealing part 134, are then bent toward the electrode leads 12, and thus may come into contact with the electrode leads 12. However, the embodiment is not limited thereto. When both the ends 1361a merely continue to extend out of the sealing part 134, both the ends 1361a are deflected by the gravity and may come into contact with the electrode leads 12.

Those with ordinary skill in the technical field to which the present invention pertains will understand that the present invention may be implemented in other specific forms without changing the technical idea or essential features. Thus, the above-described embodiments are to be considered illustrative and not restrictive to all aspects. The scope of the present invention is defined by the appended claims rather than the detailed description, and various modifications derived from the meaning and scope of the claims and the equivalent concept thereof should be interpreted as being included in the scope of the present invention.

| [Description of the Symbols] | |
| --- | --- |
| 1: Secondary battery | 2: Battery module |
| 10: Electrode assembly | 11: Electrode tab |
| 12: Electrode lead | 13: Battery case |
| 14: Insulating part | 20: Housing |
| 111: Positive electrode tab | 112: Negative electrode tab |
| 121: Positive electrode lead | 122: Negative electrode lead |
| 131: Upper case | 132: Lower case |
| 133: Cup portion | 134: Sealing part |
| 135: Piezoelectric element | 136: Short-circuit inducing part |
| 1331: Accommodation space | 1361: Both ends |

The invention claimed is:

1. A secondary battery comprising:
an electrode assembly formed by alternately stacking an electrode and a separator;
a battery case accommodating the electrode assembly therein, the battery case being a pouch made of a flexible material, the battery case comprising an upper case and a lower case that are sealed to one another at a sealing part at edges of the upper case and the lower case, the battery case having a cup portion in which the electrode assembly is located;
a plurality of electrode tabs each protruding from the electrode assembly;
a plurality of electrode leads each having a first end connected to one of the electrode tabs and a second end protruding through the battery case to an outside of the battery case;
a piezoelectric element disposed at an outside of the cup portion of the battery case and configured to supply electric power to a short-circuit inducing part made of electroactive polymers (EAP) when the battery case expands in volume, thereby causing the piezoelectric element to receive a pressure; and
the short-circuit inducing part having a wire shape with first and second ends respectively positioned on portions of the sealing part of the battery case that seal the electrode leads, the first and second ends being configured to respectively extend toward and contact first and second ones of the electrode leads when the electric power is supplied from the piezoelectric element.

2. The secondary battery of claim 1, wherein the piezoelectric element is attached to an outer surface of the cup portion.

3. The secondary battery of claim 1, wherein the piezoelectric element has a shape conforming to a shape of the cup portion.

4. The secondary battery of claim 1, wherein the piezoelectric element is attached to a central area of the cup portion.

5. The secondary battery of claim 1, wherein the short-circuit inducing part is in contact with the sealing part of the battery case.

6. The secondary battery of claim 5, wherein the first and second ones of the electrode leads extend in first and second respective opposite directions of the electrode assembly, and the short-circuit inducing part is in contact with a portion of the sealing part extending along a peripheral edge of the battery case.

7. The secondary battery of claim 1, wherein the short-circuit inducing part extends along an outer surface of the cup portion of the battery case.

8. The secondary battery of claim 1, wherein the first and second ends of the short-circuit inducing part respectively extend out of the portions of the sealing part of the battery case and are respectively bent toward the first and second ones of the electrode leads.

9. A battery module comprising a secondary battery and a housing accommodating the secondary battery therein, wherein the secondary battery comprises:
an electrode assembly formed by alternately stacking an electrode and a separator;
a battery case accommodating the electrode assembly therein, the battery case being a pouch made of a flexible material, the battery case comprising an upper case and a lower case that are sealed to one another at a sealing part at edges of the upper case and the lower case, the battery case having a cup portion in which the electrode assembly is located;
a plurality of electrode tabs each protruding from the electrode assembly;
a plurality of electrode leads each having a first end connected to one of the electrode tabs and a second end protruding through the battery case to an outside of the battery case;
a piezoelectric element disposed at an outside of the cup portion of the battery case and configured such to supply electric power to a short-circuit inducing part made of electroactive polymers (EAP) when the battery case expands in volume, thereby causing the piezoelectric element to receive a pressure; and
the short-circuit inducing part having a wire shape with first and second ends respectively positioned on portions of the sealing part of the battery case that seal the electrode leads, the first and second ends being configured to respectively extend toward and contact first and second ones of the electrode leads when the electric power is supplied from the piezoelectric element.

10. The battery module of claim 9, wherein the piezoelectric element is attached to an inner surface of the housing.

11. The battery module of claim 9, wherein the short-circuit inducing part is in contact with and extends along an edge of an inner surface of the housing.

12. The battery module of claim 9, wherein the first and second ends of the short-circuit inducing part respectively extend out of the portions of the sealing part of the battery case and are respectively bent toward the first and second ones of the electrode leads.

13. A battery pack comprising the battery module of claim 9.

14. A device comprising the battery pack of claim 13.

15. A method of inducing a short circuit in a secondary battery, the method comprising:
providing a battery case accommodating an electrode assembly therein, the battery case being a pouch made of a flexible material, the battery case comprising an upper case and a lower case that are sealed to one another at a sealing part at edges of the upper case and the lower case, the electrode assembly having an electrode and a separator alternatively stacked and a plurality of electrode tabs each protruding from the electrode assembly, and a plurality of electrode leads each having a first end connected to one of the electrode tabs and a second end protruding through the battery case to an outside of the battery case;
producing a gas inside the battery case that expands a volume of the battery case;

applying a pressure to a piezoelectric element disposed at an outside of a cup portion of the battery case, the pressure being generated due to the volume of the battery case expanding;

supplying electric power from the piezoelectric element to a short-circuit inducing part, the short-circuit inducing part having a wire shape and first and second ends respectively positioned on portions of a sealing part of the battery case that seal the electrode leads, the electric power being supplied due to the pressure being applied to the piezoelectric element;

inducing the short circuit in the secondary battery by the first and second ends of the short-circuit inducing part respectively extending toward and contacting first and second ones of the electrode leads due to the electric power being supplied to the short-circuit inducing part.

16. The method of claim 15, wherein the short-circuit inducing part is in close contact with the sealing part of the battery case, and the first and second ones of the electrode leads extend in first and second respective opposite directions of the electrode assembly, and the short-circuit inducing part is in close contact with a portion of the sealing part extending along a peripheral edge of the battery case.

17. The method of claim 15, wherein the first and second ends of the short-circuit inducing part respectively extend out of the portions of the sealing part of the battery case and are respectively bent toward the first and second ones of the electrode leads.

18. The method of claim 15, wherein the short-circuit inducing part is in close contact with and extends along an edge of an inner surface of a housing accommodating the secondary battery therein.

* * * * *